DIRECT COUPLED LOGIC CIRCUIT

Original Filed March 7, 1962

INVENTORS,
Edward D. Padgett
Christ W. Anagnost
Arthur H. Hendrickson
BY: Harry M. Saragovitz, Edward J. Kelly,
Herbert Berl & Robert P. Gibson
ATTORNEYS United States Patent Office 3,450,895

Patented June 17, 1969

3,450,895
DIRECT COUPLED LOGIC CIRCUIT

Edward D. Padgett, Morristown, Arthur H. Hendrickson, Parsippany, and Christ W. Anagnost, Dover, N.J., assignors to the United States of America as represented by the Secretary of the Army Original application Mar. 7, 1962, Ser. No. 178,518, now Patent No. 3,218,470, dated Nov. 16, 1965. Divided and this application Mar. 23, 1964, Ser. No. 359,813
Int. Cl. H03k *19/08, 19/12*
U.S. Cl. 307—204 1 Claim

ABSTRACT OF THE DISCLOSURE

A direct coupled logic circuit consisting of two connected parallel circuits wherein each of the parallel circuits comprise first and second series connected SCR's in parallel with another first and second series connected SCR's. The anodes and gates of each of the first SCR's are connected to a first positive electrical signal source and the gates of each of the second SCR's are connected to another positive electrical signal source whereby when coincidence is obtained between the positive electrical signals the circuit will pass a signal to a load connected in the output of one of the parallel circuits and to a load connected in the output of the other of the two parallel circuits. In the event that one SCR fails, its parallel counterpart will continue to function and the signal will still be passed to the related load.

This application is a division of application Ser. No. 178,518, filed Mar. 7, 1962, now Patent No. 3,218,470.

The invention described herein may be manufactured and used by or for the Government for governmental purposes without the payment to us of any royalty thereon.

This invention relates to switching or logic circuits and more particularly to direct-coupled switching or logic circuits using semiconductor junction devices.

In the past much effort has been directed toward achieving a reduction in the size and weight as well as an increase in reliability of various switching circuits. As a result of the continued engineering efforts exerted along these lines, there has been some reduction in size and weight of various switching components. There are, however, certain of these components used in various switching circuits which have remained virtually unchanged. By far the most common of these unchanged components is the relay.

The common difficulties with switching relays have been their size and reliability. To overcome the reliability problem, explosive type switches have been used in place of relays in certain circuit designs but, although the reliability of these switches may be somewhat higher, such switching circuits cannot be tested and then used as the switch is a "one shot" device. There are also the problems of size, weight and mechanical moving parts which are not overcome by using explosive switches.

Various attempts have been made in the past to use semiconductor devices in place of the usual mechanical relay but it has been found that not all such conductors have satisfactory properties adapting them to this use. The germanium-type semiconductors, for example, are not reliable enough for such use since their performance deteriorates at temperatures near 165° F. and permanent damage to the units may result if they are subjected to temperatures near 200° F. These high temperatures are not uncommon in certain type circuits such as, for example, missile arming systems. Silicon transistors, although not so sensitive to high temperature changes, in their conducting state have a relatively high value of saturation resistance thus requiring large amounts of power. This high power consumption also presents a heat dissipation problem which is not readily overcome in most circuits. The double-base diodes which are presently available cannot handle the currents required in most switching circuits and therefore are not usable.

It was found, however, that a p-n-p-n or equivalent semiconductor device, such as a silicon controlled rectifier, has the desired characteristics necessary for a semiconductor switching device. The controlled rectifier has a reverse characteristic which is similar to a normal silicon rectifier in that it represents essentially an open circuit with negative anode to cathode voltage. The forward characteristic is that it will block positive anode to cathode voltage below a critical break-over voltage if no signal is applied to the control or gate electrode. However, by exceeding the forward break-over voltage or by alloying an appropriate signal to the control or gate electrode, the device will rapidly switch to a conducting state and present the characteristically low forward voltage drop of a single junction silicon rectifier. Thus it may be seen that from a practical standpoint the operation of the silicon controlled rectifier is somewhat similar to a thyratron. Once a signal has been applied to the gate electrode to turn the device "on" it cannot be turned "off" without reducing the anode voltage to near zero volt.

From this it may be seen that if a battery is connected between the "first p-" or anode and the "last n-" or cathode electrodes of a silicon controlled rectifier, the electrical current that flows is negligible. For this configuration the plurality of junctions can be considered as being either a large blocking capacitor, or as being a "high impedance" device, with no load current other than the low value of forward leakage current flowing through the device. When an additional gating electrode is attached to the positive terminal of the battery, the semiconductor configuration will switch to a conducting or low impedance state and a large value of electrical current will flow through the anode and cathode electrodes of the device. It may thus be seen that the first and second p-n junctions are somewhat comparable to the open contacts of a relay. The "gating" action of the gate electrode of the semiconductor can be compared to the coil of a relay. If a current flows through the gate electrode, it biases the p-n-p-n device in a manner that causes it to change from a "high impedance state" to a "low impedance state" thereby allowing a large current to flow from "anode to cathode." If an increasing current flows through the coil or a relay, a value is soon reached which causes the contacts to close, thereby allowing a large current to flow through the closed contacts.

These characteristics of a suitable p-n-p-n configuration are useful because it can be used in direct-coupled logic circuitry to control and transmit electrical energy in an intelligent manner. The use of these semiconductors rather than relay or mechanical switching devices allows the system to operate with greater precision, speed and reliability as are required by electronic navigation computer, arming, safing, and fuzing systems found in missiles, rockets, and space vehicles.

It is therefore, an object of this invention to provide a switching system using semiconductor junction devices.

Another object of this invention is to provide a direct-coupled logic circuit which has no moving parts yet forms the functions of a mechanical relay.

Yet another object of this invention is to provide a logic circuit that has a faster operating speed than heretofore obtainable using devices having mechanically movable parts.

Still another object is to provide a switching system that has a higher degree of reliability than prior known circuits.

A further object of this invention is to provide a switching system that is lighter, smaller in size and rugged in construction than heretofore known systems.

Other objects and advantages of the present invention will, of course, become apparent and immediately suggest themselves to those skilled in the art to which the invention is directed from a reading of the following specification in connection with the accompanying drawing in which.

Figure 1:
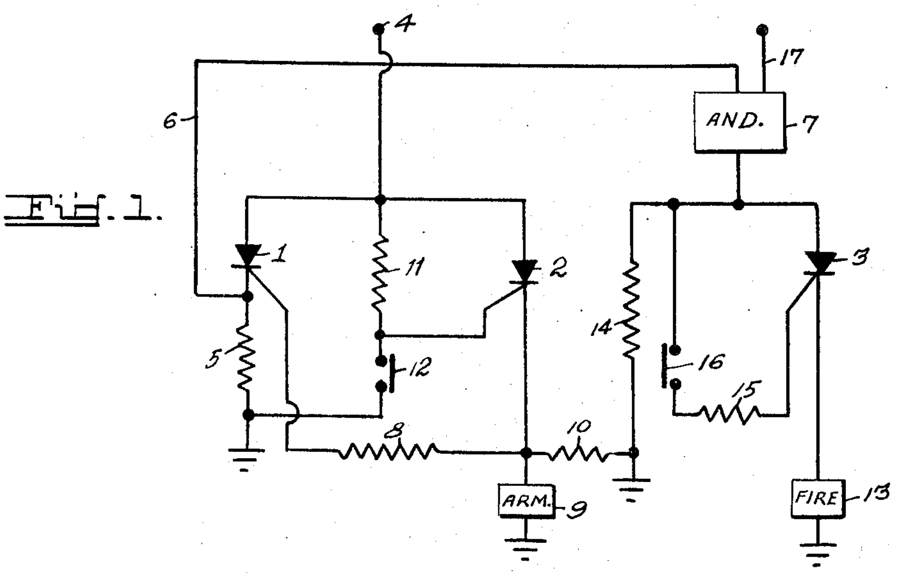
FIGURE 1 is a schematic diagram of a direct coupled p-n-p-n logic circuit constructed in accordance with the present invention.

In FIGURE 1 there is shown a multiplicity of suitable p-n-p-n semiconductor devices 1–3 directly coupled to each other in a manner that controls and transmits electrical energy in an intelligent manner. The input terminal 4, to which positive pulses are to be applied, is directly connected to the anodes of the devices 1 and 2. The cathode of device 1 is connected to ground through a resistor 5. An electrical conductor 6 is connected between the cathode of device 1 and to one input of an AND gate 7. A second input terminal 17 is also connected to the input of the AND gate 7. The control or gate electrode of device 1 is connected through a resistor 8 to an output circuit 9 which may be, for example, an arming circuit of a warhead. The cathode of device 2 and a grounding resistor 10 are also connected to the input of the circuit 9. Connected between the anode and control or gate electrode of device 2 is a resistor 11. The gate electrode and one terminal of the resistor are connected through a switch 12 to ground. The device 3 has its cathode connected to a second output circuit 13 which may be, for example, the firing circuit of a warhead. The anode of device 3 is connected through a resistor 14 to ground. Connected between the anode and control or gate electrode of device 3 are a resistor 15 and a switch 16. The switches 12 and 16 may be operated independent or ganged together depending on which is more desirable. The switches may be operated in response to a change in condition such as, for example, a change in barometric pressure if such is desired. However, it is to be understood that other switches and programing may be used.

The operation of the switching or logic system as shown in FIGURE 1 may be explained in the following manner. An electrical signal in the form of a positive pulse is applied to the anodes of devices 1 and 2 through the input terminal 4. If the switch contacts 12 in FIGURE 1 are closed, the input pulse will be passed through the resistor 11 to ground. As long as the switch contacts remain closed, the system will not respond to the electrical signals applied to the input terminal 4. If, however, the switch contacts are opened, as by a change in barometric pressure, the electrical signal appearing on the input terminal 4 will be applied to the anodes of the devices 1–2 and through resistor 11 to the control or gate electrode of the device 2. With a positive pulse applied to the gate electrode, the device 2 becomes conductive and applies a signal to the output circuit 9. This output circuit may be of any desired type but for purposes of this explanation it is assumed to be an arming circuit of a warhead. As can be seen the pulse applied through the conductive device 2 will operate the arming circuit thus preparing the warhead for firing. The pulse applied to the arming circuit input will also be applied through resistor 8 to the control or gate electrode of the device 1. This application of a positive pulse to the gate electrode of the device 1 will cause the device to become highly conductive. With the device 1 in conductive state, the signal appearing on the input terminal 4 will be passed through the device 1 and through the electrical conductor 6 to one of the inputs of the AND gate 7. If no signal is applied simultaneous with the other input 17 of the AND gate while the device 1 is conducting, then there will be no signal applied through the gate to the anode device 3. As long as there is an absence of the signal on input terminal 17, the firing circuit 13 will receive no signal even though the arming circuit 9 is receiving a signal. It is to be understood that the output circuit 13 may be of any desired type but for purposes of this explanation it is considered to be the firing circuit of a warhead. Thus, it may be seen that the circuit acts in a manner so that no premature explosion of the warhead will occur. If however, there is an input signal present simultaneously on the input leads 6 and 17 of the AND gate, the gate will pass a signal to the anode of device 3. If the contacts of the switch 16 are open, as shown in FIGURE 1, then the device 3 will not conduct and the firing circuit 13 will not be activated. If, however, the contacts of the switch 16 are closed, the positive pulse passed by the gate 7 will be applied to the gate electrode of the device 3 through the resistor 15. With a positive signal applied to its gate electrode, the device 3 will become conductive and a signal will be applied to the firing circuit 13. With both the arming and firing circuits receiving an activating signal the warhead will be detonated.

It should be noted that the direct-coupled logic circuit has no devices such as capacitors or relays as are commonly found in such circuits. The absence of the elements allows a faster, more reliable control system for transmitting intelligence, in proper sequence, to a warhead system than heretofore obtainable. Also, since the p-n-p-n devices have been used to replace the moving contacts of the normally used relays, the system is lighter in weight and more compact in size.

Figure 2:
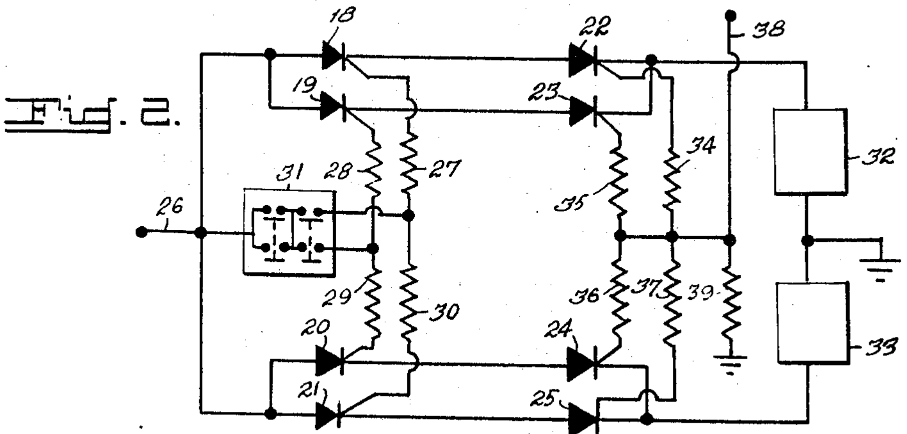
FIGURE 2 is a schematic diagram of a stabilized direct coupled logic circuit.

In FIGURE 2 there is shown a circuit which has a high resistance against leakage current and which has the quality of "positive action" should one or more of the semiconductor devices used in the circuit fail. The circuit consists of a plurality of the semiconductor devices 18–25 connected in a series-parallel arrangement. The input terminal 26 is connected to the anodes of the devices 18–21 while the control or gate electrodes of these devices are connected through resistors 27–30 to one terminal of a switch 31. The other terminal of switch 31 is connected to the input terminal 26. The switch 31 may be the type that is responsive to a change in a programed condition such as barometric pressure if such is desirable. It should be noted that the switch shown is of the positive action type; that is, one that provides a plurality of possible paths to assure an electrical circuit when the switch is in its closed position. The anodes of the devices 22–25 are connected, respectively, to the cathodes of the devices 18–21. The cathodes of the devices 22 and 23 are connected to the input of a load circuit 32 while the cathodes of the devices 24 and 25 are connected to a second load circuit 33. The control or gate electrodes of the devices 22–25 are connected through resistors 34–37, respectively, to the input terminal 38. Also connected to the input terminal 38 is a ground resistor 39.

The operation of the circuit of FIGURE 2 is such that only when the switch 31 is closed and a positive electrical signal is simultaneously applied to the terminals 26 and 38 will the circuit pass an electrical signal to the load circuits 32 and 33. It can be seen that with a positive electrical signal applied to the terminal 26 and with the switch 31 in a closed position, the control or gate electrodes of the devices 18–21 will have a positive signal applied to them and thus place the devices in a highly conductive state. A positive pulse applied to the terminal 38 will be conducted through the resistors 34–37 to the control or gate electrodes of the devices 22–25. The presence of a positive signal on these gate electrodes will cause the devices 22–25 to be placed in their highly conductive state. It can be seen that, with all the devices in their conductive state, a signal will be applied to the load devices 32 and 33. Should one of the devices fail to conduct, a signal will still be applied through the parallel circuit to the load. For example, assume that the device 18 failed to operate when its gate electrode has a positive signal applied thereto. The signal from terminal 26 will pass through devices 19 and 23 to the load device 32. This arrangement assumes that the change of a load circuit not receiving a signal will be at a minimum since the chance of failure in both the parallel circuits will be very small. The series arrangement of the devices is used to prevent the premature passing of signal to the load circuit which might occur if there was a sudden change in the characteristics of one of the devices.

Figure 3:
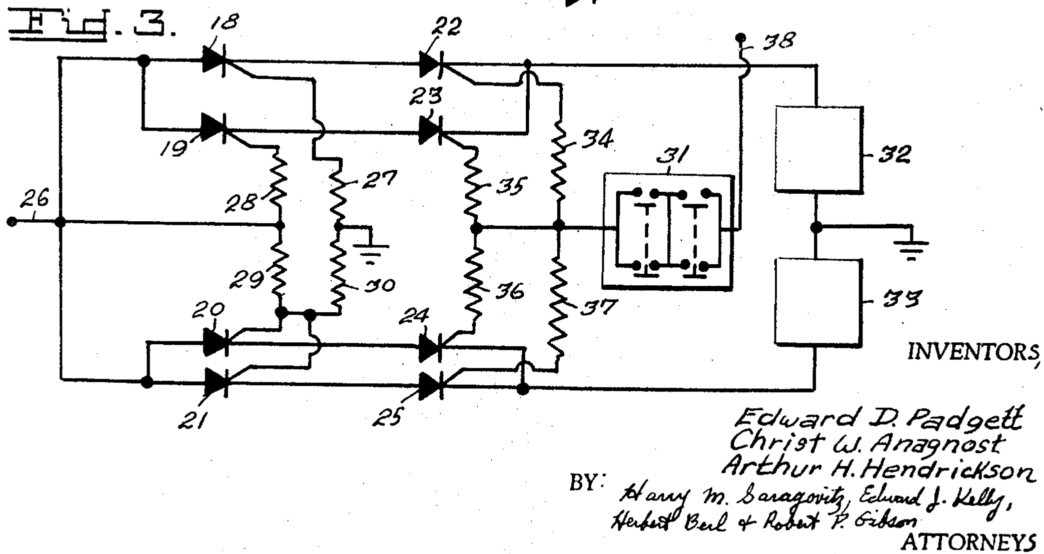
FIGURE 3 is another schematic diagram showing a preferred form of a stabilized direct coupled logic circuit.

Another arrangement of a stabilized direct coupled logic circuit is shown in FIGURE 3 where like parts have the same numerals as those of FIGURE 2. The control circuit, switch 31, has been placed between the terminal 38 and the resistors 34–37. The resistors 27 and 30 have been grounded in order to add greater stability to the circuit. The operation of this circuit is substantially the same as that of FIGURE 2 and needs no further explanation. It is noted that the control circuit, switch 31, is uniquely and advantageously isolated from the high current load circuit devices 32 and 33.

It is to be understood that the above-described arrangements are but illustrative of the application of the principles of the invention. Numerous other arrangements may be advised by those skilled in the art without departing from the spirit of the invention and scope of the claim.

What is claimed is:

1. A direct-coupled logic circuit comprising, a plurality of semiconductor rectifiers, each rectifier having an anode, cathode and control electrode, means connecting the rectifiers into a first, second, third and fourth group of at least a first and second rectifier, the first and second rectifiers of each group being connected in series so that the cathode electrode of the first rectifier is connected to the anode electrode of the second rectifier, means connecting the first and second groups of rectifiers together to form a first parallel circuit, means connecting the third and fourth groups of rectifiers together to form a second parallel circuit, a first input terminal connected to the first and second parallel circuits, a first output circuit connected to the first parallel circuit, a second output circuit connected to the second parallel circuit, a switching circuit connected between the input terminal and the control electrodes of the first rectifiers of the series groups, and a second input terminal connected to the control electrodes of the second rectifiers of the series groups so that when a signal is present on both input terminals and the switch is closed a signal is applied to the first and second output circuits.

References Cited

UNITED STATES PATENTS 3,069,562 12/1962 Steele ---------------- 307—204

RODNEY D. BENNETT, Jr., *Primary Examiner.*

RICHARD E. BERGER, *Assistant Examiner.*

U.S. Cl. X.R.

307—244, 248, 252